United States Patent
Setiabudi et al.

[11] Patent Number: 6,100,323
[45] Date of Patent: *Aug. 8, 2000

[54] CURABLE COMPOSITION COMPRISING A DIELS-ALDER-ADDUCT OF CYCLOPENTADIENE AND A FILLER

[75] Inventors: Frans Setiabudi, Eschbach, Germany; Andreas Mühlebach, Belfaux, Switzerland; Yoshiaki Naganuma, Hyogo, Japan

[73] Assignee: Ciba Specialty Chemicals Corp., Tarrytown, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/812,231

[22] Filed: Mar. 6, 1997

[30] Foreign Application Priority Data

Mar. 7, 1996 [CH] Switzerland ............... 601/96

[51] Int. Cl.[7] ........................................ C08J 3/28
[52] U.S. Cl. ........................ 524/430; 524/450; 524/554
[58] Field of Search .................... 524/430, 450, 524/554

[56] References Cited

U.S. PATENT DOCUMENTS 4,584,425   4/1986   Tom ............................. 585/827

FOREIGN PATENT DOCUMENTS

| 0084888 | 8/1983 | European Pat. Off. . |
| 0348852 | 1/1990 | European Pat. Off. . |
| 9616100 | 5/1996 | WIPO . |
| 9620235 | 7/1996 | WIPO . |

*Primary Examiner*—Peter D. Mulcahy
*Attorney, Agent, or Firm*—David R. Crichton; Michele A. Kovaleski

[57] ABSTRACT

A composition, comprising
(a) a Diels-Alder-adduct of cyclopentadiene,
(b) a catalyst for the ring-opening metathesis polymerisation, and
(c) 2–95% by weight of a filler, based on the entire composition,
   the filler containing at least 0.5% by weight of a basic adsorbent, based on the entire composition,
   gives cured products having excellent mechanical and electrical properties and is particularly suitable as coating material for electrical and electronic components.

13 Claims, No Drawings

CURABLE COMPOSITION COMPRISING A DIELS-ALDER-ADDUCT OF CYCLOPENTADIENE AND A FILLER

The present invention relates to a composition comprising a Diels-Alder-adduct of cyclo-pentadiene, a ROMP catalyst and a filler containing a basic adsorbent, to a process for the preparation of a metathesis polymer from this composition as well as to the use of said composition as coating material for electrical or electronic components.

Owing to their good mechanical and electrical properties, cycloolefins, which can be polymerised by ring-opening metathesis-polymerisation (ROMP), should in principle be suited for electrical applications. Because of their relatively low price, dicyclopentadiene and norbornene derivates are particularly suitable for this purpose. Such systems are disclosed, inter alia, in WO 96/16100, WO 96/20235 or in EP-A-348 852.

U.S. Pat. No. 4,584,425 recommends distilling commercially available dicyclopentadiene prior to the ROMP reaction and subsequently treating it with aluminium oxide or a zeolite.

When using the curable compositions as coating material for electrical or electronic components, it is advisable to add fillers to increase their mechanical strength. Such compositions are described, inter alia, in EP-A-84 888.

However, the rapid cure of filled ROMP systems based on dicyclopentadiene and norbornene derivatives gives products having a relatively low glass transition temperature.

It is the object of this invention to provide filled resin systems for the ring-opening metathesis polymerisation which can be rapidly cured at a high temperature to give products having a high glass transition temperature.

It has now been found that this object can be achieved by adding a basic adsorbent to the filler.

This invention relates to a composition, comprising
(a) a Diels-Alder-adduct of cyclopentadiene,
(b) a catalyst for the ring-opening metathesis polymerisation, and
(c) 2–95% by weight of a filler, based on the entire composition,
the filler containing at least 0.5% by weight of a basic adsorbent, based on the entire composition.

Component (a) can, in principle, be all those compounds which can be prepared by Diels-Alder reaction of cyclopentadiene with suitable dienophiles.

Suitable Diels-Alder-adducts are, for example, the following compounds:

(1)

, (2)

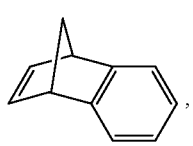, (3)

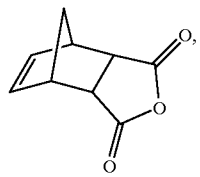

(4)

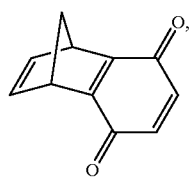

(5)

, (6)

, (7)

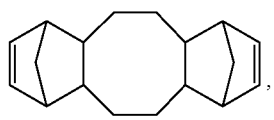, (8)

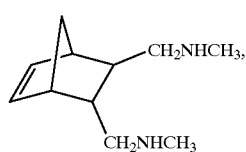, (9)

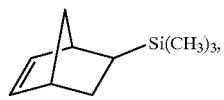, (10)

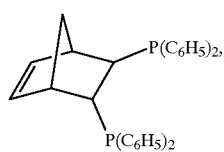, (11)

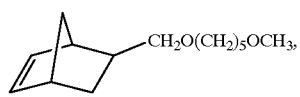, (11)

,

-continued

(12) 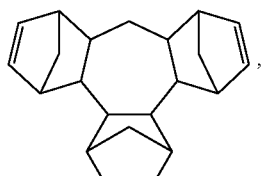

(13) 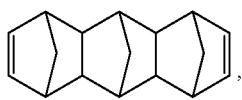

(14) 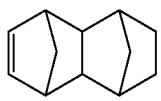

(15) 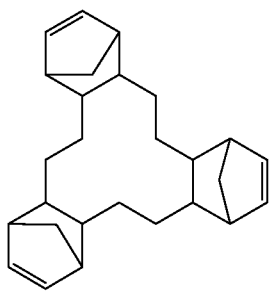

(16) 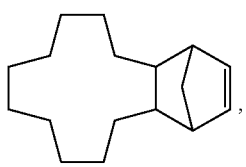

(17) 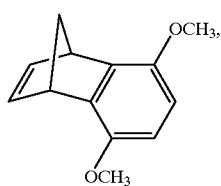

(18) 

(19) 

(20) 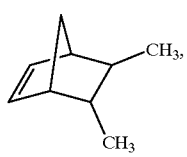

(21) 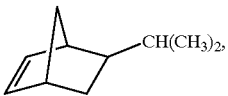

(22) 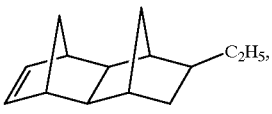

(23) 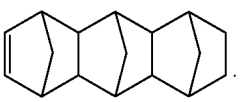

Preferred Diels-Alder-adducts are tetracyclododecene (14), methyltetracyclododecene (11) and, in particular, dicyclopentadiene (18).

As catalysts for the ring-opening metathesis polymerisation (ROMP catalysts), many compounds of the titanium, vanadium, molybdenum, tungsten, rhenium, iridium, ruthenium and osmium transition metals are known to the person skilled in the art. These are, for example, complex metal halides, metal carbenes or coordination catalysts of the Ziegler-Natta type. In principle, all these known ROMP catalysts can be used as component (b) in the compositions of this invention.

Component (b) is preferably a ruthenium(+II) complex salt or an osmium(+II) complex salt, particularly preferably a ruthenium(+II) complex salt.

Because the use of absolutely anhydrous substances and apparatus requires additional expenditure, it is advisable to use ROMP catalysts which are unaffected by moisture, for example the ruthenium(+II) and osmium(+II) complex salts described in WO 96/16100 and WO 96/20235.

Accordingly, preferred ROMP catalysts are ruthenium(+II) complex salts of formula I $$(R_1R_2R_3P)_xL_yRu^{2+}Z_1^-Z_2^-  \quad (I),$$

wherein $R_1$, $R_2$ and $R_3$ are each independently of one another phenyl, tolyl or cyclohexyl, L is benzene, thiophene, benzonitrile, acetonitrile, nitrogen ($N_2$), each of which is unsubstituted or substituted by 1 to 3 $C_1$–$C_4$alkyl, or unsubstituted or partially or completely fluorinated $C_1$–$C_4$alcohol, CO, $H_2O$ or $NH_3$, $Z_1^-$ and $Z_2^-$ are each independently of the other H$^-$, Cl$^-$, Br$^-$, BF$_4^-$, PF$_6^-$, SbF$_6^-$, AsF$_6^-$, CF$_3$SO$_3^-$, C$_6$H$_5$—SO$_3^-$, p-toluenesulfonate (tosylate), 3,5-dimethylphenylsulfonate, 2,4,6-trimethylphenylsulfonate, 4-trifluoromethylphenylsulfonate or cyclopentadienyl, x is a number from 1 to 3, and y is a number from 0 to 3, 2 being $\leq x+y \leq 4$.

Further suitable ROMP catalysts are the metal carbene complexes described in WO 93/20111.

Preferred metal carbene complexes are the compounds of formula II

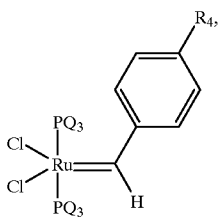

(II)

wherein Q is phenyl, cyclopentyl or cyclohexyl, and $R_4$ is hydrogen, chloro or tert-butyl.

Particularly preferred ROMP catalysts are [(cyclohexyl)$_3$P]$_2$RuCl$_2$, [(C$_6$H$_5$)$_3$P]$_3$ RuCl$_2$, [(C$_6$H$_5$)$_3$P]$_3$ (CO)RuH$_2$, [(C$_6$H$_5$)$_3$P]$_3$ RuCl(cyclopentadienyl), [(cyclohexyl)$_3$P]$_2$(CH$_3$OH)Ru-(tosylate)$_2$, [(o-tolyl)$_3$P]$_3$RuCl$_2$, [(CH$_3$)$_2$CH]$_3$P(p-cymene)RuCl$_2$ and, in particular, (cyclohexyl)$_3$P(p-cymene)RuCl$_2$.

Suitable fillers which can be used as component (c) in the novel compositions are, for example, metal powder, wood flour, powdered glass, glass beads, semimetal oxides and metal oxides, typically SiO$_2$ (aerosils, quartz, quartz powder, fused silica), corundum and titanium oxide, semimetal nitrides and metal nitrides, typically silicium nitride, boron nitride and aluminium nitride, semimetal carbides and metal carbides (SiC), metal carbonates (dolomite, chalk, CaCO$_3$), metal sulfates (baryte, gypsum), mineral powders and natural or synthetic minerals, especially from the silicate series, for example talcum, mica, kaolin, wollastonite, bentonite, and others.

Component (c) is preferably a metal oxide, metal carbonate, metal sulfate or metal silicate, or SiO$_2$.

Component (c) is particularly preferably SiO$_2$.

Of the different SiO$_2$ modifications, quartz powder and synthetic silica flour are particularly preferred.

Basic adsorbents may, in principle, be all adsorbents known in chromatography, provided they react, if required after a corresponding pretreatment, alkaline in aqueous solution.

Illustrative examples of suitable adsorbents are basic aluminium oxide, silica gels, diatomaceous earth, magnesium silicate (florisil), cellulose, polyamides as well as natural and synthetic zeolites.

Preferred basic adsorbents are basic aluminium oxide, silica gels and, in particular, zeolites.

It is particularly preferred to use the natural and synthetic zeolites known as molecular sieves in the novel compositions. Neither the pore size nor the crystal structure of the zeolite is critical for the concept of this invention, i.e. it is possible to use zeolites of the A, X, Y and L type having the customary pore sizes of about 3–10 Ångström without any restrictions.

In the compositions of this invention, the amounts of components (a), (b) and (c) can vary within wide limits.

The novel compositions preferably comprise 15–96% by weight of component (a), 0.001–10.0% by weight of component (b), and 4–85% by weight of component (c), based on the entire composition.

Particularly preferred novel compositions are those comprising 25–65% by weight, more preferably 30–50% by weight, of component (a), 0.01–2.0% by weight, more preferably 0.1–1.0% by weight, of component (b), and 30–75% by weight, more preferably 50–70% by weight, of component (c).

The basic adsorbent content in filler (c) can also vary within wide limits and may be up to 95% by weight, based on the entire composition.

The basic adsorbent is preferably present in an amount of 1.0–10.0% by weight, more preferably of 2.0–5.0% by weight, based on the entire composition.

The desired viscosity of the curable mixture can be adjusted by adding thermoplastic materials. Typical examples of suitable thermoplasts are polystyrene, polynorbornene (e.g. Norsorex® NS, supplied by Nippon Zeon), hydrated polynorbornene derivatives (e.g. Zeonex®, supplied by Nippon Zeon), polycyclooctene (e.g. Vestenamer®, supplied by Hüls), and polybutadiene.

The curable mixtures can also comprise tougheners, for example core/shell polymers or the elastomers or elastomer-containing graft polymers known to the skilled person as rubber tougheners.

Suitable tougheners are described, inter alia, in EP-A-449 776.

To improve the electrical properties (dielectric constant, loss factor) of the curable mixtures, silanes, such as the compounds provided by Osi Specialties under the registered trademark Silquest® Silan, may be added. Suitable silanes are typically octyltriethoxysilane, methyltriethoxysilane, vinyltriethoxysilane, methyltrimethoxysilane, vinyltrimethoxysilane, γ-aminopropyltrimethoxysilane and γ-glycidyloxypropyltrimethoxysilane.

In addition to the above-mentioned additives, the novel compositions can contain further customary additives, typically antioxidants, light stabilisers, plasticisers, colourants, pigments, thixotropic agents, antifoams, antistatic agents, lubricants and mould release agents.

The novel composition can also contain inert solvents. Suitable inert solvents are, for example, protic-polar and aprotic solvents which can be used by themselves or in mixtures consisting of at least two solvents. Typical examples are: ethers (dibutyl ether, tetrahydrofuran, dioxane, 2-methoxyethanol or ethylene glycol dimethyl ether, 2-ethoxyethanol or ethylene glycol diethyl ether, diethylene glycol diethyl ether, triethylene glycol dimethyl ether), halogenated hydrocarbons (methylene chloride, chloroform, 1,2-dichloroethane, 1,1,1-trichloroethane, 1,1,2,2-tetrachloroethane), carboxylates and lactones (ethyl acetate, methyl propionate, ethyl benzoate, 2-methoxyethyl acetate, γ-butyrolactone, δ-valerolactone, pivalolactone), carboxamides and lactams (N,N-dimethylformamide, N,N-diethylformamide, N,N-dimethyl acetamide, tetramethylurea, hexamethylphosphoric triamide, γ-butyrolactam, ε-caprolactam, N-methylpyrrolidone, N-acetylpyrrolidone, N-methylcaprolactam), sulfoxides (dimethylsulfoxide), sulfones (dimethylsulfone, diethylsulfone, trimethylenesulfone, tetramethylenesulfone), tertiary amines (N-methylpiperidine, N-methylmorpholine), aliphatic and aromatic hydrocarbons, typically petroleum ether, pentane, hexane, cyclohexane, methylcyclohexane, benzene or substituted benzenes (chlorobenzene, o-dichlorobenzene, 1,2,4-trichlorobenzene, nitrobenzene, toluene, xylene) and nitriles (acetonitrile, propionitrile, benzonitrile, phenylacetonitrile). Preferred solvents are aprotic polar and nonpolar solvents.

Preferred solvents are aliphatic and aromatic hydrocarbons as well as mixtures of such solvents.

It is a particular advantage of the novel compositions that in the case of liquid monomers a metathesis polymerisation can be carried out without using a solvent.

The preparation of the novel compositions can be carried out in customary manner by mixing the components using known mixing units (stirrer, kneader, rolls, mills, dry mixers or thin film degassing mixer).

The novel composition can be prepared directly before polymerisation or can be used in the form of a preformulated mixture. The mixture can be stored for an extended period of time as ready-to-use formulation before polymerisation, which is advantageous for large scale industrial application. However, it is advisable to store the mixture with the exclusion of light if the catalyst contains photosensitive ligands.

In another of its aspects, this invention relates to a process for the preparation of a metathesis polymer, which comprises heating a composition comprising components (a) to (c) to a temperature of >40° C.

The process of this invention is conveniently carried out at a temperature of at least 60° C. The novel process is carried out in particular in the temperature range from 60 to 300° C., preferably from 60 to 250° C., more preferably from 60 to 200° C. and, most preferably, from 70 to 160° C. After polymerisation it may be useful to after-bake the mixture at elevated temperatures, typically in the range from 80 to 200° C.

The polymerisation can involve moulding processes, for example calendering, casting, compression moulding, injection moulding or extruding processes. Using the novel process it is possible to prepare materials for the preparation of moulded articles of all kinds as well as coatings. Moulding and polymerisation are usefully combined in solvent-free reactive systems, in which case it is possible to use processing techniques such as injection moulding, extrusion, polymerisations in given moulds (if required under pressure).

The metathesis polymers prepared according to the novel process can additionally contain homopolymers, copolymers with random distribution of the structural units, graft polymers, block polymers or crosslinked polymers. The polymers may have an average molecular weight of 500 up to 2000000 dalton, preferably of 1000 to 1000000 dalton (determined by gel permeation chromatography).

The metathesis polymers prepared in accordance with the novel process are particularly distinguished by their high heat stability, excellent toughness and mechanical strength as well as by good electrical properties (low dielectric constant, low loss factor or tano value) and are particularly suitable for applications in vacuum casting technology, especially as coating materials for electrical and electronic components.

The cured casting compounds have good mechanical and dielectrical properties and long durability.

Accordingly, this invention also relates to the use of the novel compositions as coating materials for electrical or electronic components.

It has also been found that the bad smell which usually develops when commercially available dicyclopentadiene (94%), which has a relatively strong unpleasant smell, is demoulded, is markedly reduced in the novel compositions as compared to analogous compositions which do not contain any basic adsorbent.

EXAMPLES

The dicyclopentadiene used in Examples 1 and 2 is dried for at least 4 days at room temperature over KOH or over a molecular sieve (5 Ångström). Prior to use, the required amount of dicyclopentadiene is degassed for about 5 minutes under vacuum (3 mbar). In Examples 3–6, commercially available dicyclopentadiene, supplied by Shell (94%), is used. The ROMP catalyst in all Examples is (cyclohexyl)$_3$P(p-cymene)RuCl$_2$ (catalyst A).

In addition, the following commercially available substances are used:
Byk 066: antifoam (Byk Chemie)

quartz powder W 12: filler (Quarzwerke Frechen)
Norsorex® NS: thermoplastic polynorbornene (Nippon Zeon)
Silquest® A-171: vinyltrimethoxysilane (Osi Specialties)
Smellrite®: zeolite (UOP)
Abscents® 1000: zeolite (UOP)
Abscents® 3000: zeolite (UOP)

Example 1 (comparison)

A mixture of 38.95 g of dicyclopentadiene and 0.4 g of polynorbornene (Norsorex® NS) is heated to 80° C. When the polynorbornene is completely dissolved, the mixture is allowed to cool to 60° C. and then, with stirring, 0.49 g of Silquest® A-171 and 0.26 g of Byk 066 are added. Subsequently, 0.2 g of catalyst A is added and the mixture is stirred for 20–25 min at 60° C. until the catalyst is completely dissolved. 59.7 g of quartz powder W 12 are then added in increments without any further heating. The reaction mixture is stirred for another 1 h, briefly evacuated and then poured into a metal mould. This mould is then rapidly cured at high temperature (4 h/150° C.).

The cured mixture has a glass transition temperature T$_g$ of 50° C. (measured by DSC, Mettler TA 4000).

Example 2

A mixture of 38.95 g of dicyclopentadiene and 0.4 g of polynorbornene (Norsorex® NS) is heated to 80° C. When the polynorbornene is completely dissolved, the mixture is allowed to cool to 60° C. and then, with stirring, 0.49 g of Silquest® A-171 and 0.26 g of Byk 066 are added. Subsequently, 0.2 g of catalyst A is added and the mixture is stirred for 20–25 min at 60° C. until the catalyst is completely dissolved. A mixture of 56.7 g of quartz powder W 12 and 3.0 g of molecular sieve (5 Ångström, powdered, supplied by Fluka) is added in increments without any further heating. The reaction mixture is stirred for another 1 h, briefly evacuated and then poured into a metal mould. This mould is then rapidly cured at high temperature (4 h/150° C.).

The cured mixture has a glass transition temperature T$_g$ of 93° C. (measured by DSC, Mettler TA 4000).

Examples 3–6

The mixtures listed in Table 1 are each cured in a closed flat container (diameter: 6 cm), which has a small aperture, over 3 h at 80° C. On opening the container, it is found that those mixtures which contain zeolite (Examples 3–5) have a considerably fainter smell than the analogous mixture without zeolite (Example 6).

TABLE 1

| Example | 3 | 4 | 5 | 6 (comparison) |
|---|---|---|---|---|
| dicyclopentadiene [g] | 98.2 | 98.2 | 98.2 | 98.2 |
| Norsorex ® NS [g] | 1.7 | 1.7 | 1.7 | 1.7 |
| Smellrite ® [g] | 0.5 | — | — | — |
| Abscents ® 1000 [g] | — | 0.5 | — | — |
| Abscents ® 3000 [g] | — | — | 0.5 | — |
| catalyst A | 0.3 | 0.3 | 0.3 | 0.3 |
| T$_g$/° C. | 89.6 | 88.3 | 86.1 | 81.8 |
| smell | very faint | faint | faint | strong |

What is claimed is:

1. A composition, comprising
(a) a Diels-Alder-adduct of cyclopentadiene, (b) a catalyst for the ring-opening metathesis polymerisation, and (c) 2–95% by weight of a filler, based on the entire composition, the filler containing at least 0.5% by weight of a basic adsorbent selected from basic aluminum oxide, a silica gel or a zeolite, based on the entire composition.

2. A composition according to claim 1, wherein component (a) is dicyclopentadiene, tetracyclododecene or methyltetracyclododecene.

3. A composition according to claim 1, wherein component (a) is dicyclopentadiene.

4. A composition according to claim 1, wherein component (b) is a ruthenium(+II) complex salt or an osmium(+II) complex salt.

5. A composition according to claim 1, wherein component (b) is a ruthenium(+II) complex salt of formula I

(I), wherein $R_1$, $R_2$ and $R_3$ are each independently of one another phenyl, tolyl or cyclohexyl, L is benzene, thiophene, benzonitrile, acetonitrile, nitrogen ($N_2$), each of which is unsubstituted or substituted by 1 to 3 $C_1$–$C_4$alkyl, or unsubstituted or partially or completely fluorinated $C_1$–$C_4$alcohol, CO, $H_2O$ or $NH_3$, $Z_1^-$ and $Z_2^-$ are each independently of the other H$^-$, Cl$^-$, Br$^-$, BF$_4^-$, PF$_6^-$, SbF$_6^-$, AsF$_6^-$, CF$_3$SO$_3^-$, C$_6$H$_5$—SO$_3^-$, p-toluenesulfonate (tosylate), 3,5-dimethylphenylsulfonate, 2,4,6-trimethylphenylsulfonate, 4-trifluoromethylphenylsulfonate or cyclopentadienyl, x is a number from 1 to 3, and y is a number from 0 to 3, 2 being $\leq x+y \leq 4$.

6. A composition according to claim 1, wherein component (b) is a compound of formula II

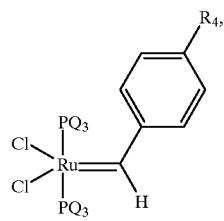

(II)

wherein Q is phenyl, cyclopentyl or cyclohexyl, and $R_4$ is hydrogen, chloro or tert-butyl.

7. A composition according to claim 1, wherein component (b) is (1-methyl-4-isopropylbenzene)RuCl$_2$P(cyclohexyl)$_3$.

8. A composition according to claim 1, wherein component (c) is a metal oxide, metal carbonate, metal sulfate or metal silicate, or SiO$_2$.

9. A composition according to claim 1, wherein component (c) is SiO$_2$.

10. A composition according to claim 1, wherein the basic adsorbent is a zeolite.

11. A composition according to claim 1, comprising 15–96% by weight of component (a), 0.001–10.0% by weight of component (b), and 4–85% by weight of component (c), based on the entire composition.

12. A composition according to claim 1, wherein the basic adsorbent is present in an amount of 1.0–10.0% by weight, based on the entire composition.

13. A process for the preparation of a metathesis polymer, which comprises heating a composition as claimed in claim 1 to a temperature of >40° C.

* * * * *